United States Patent [19]

Ricci

[11] Patent Number: 5,030,046
[45] Date of Patent: Jul. 9, 1991

[54] VALVE SEAL RING SEATING MACHINE

[76] Inventor: Donato L. Ricci, Rte. 1, Box 1067, Hager City, Wis. 54014

[21] Appl. No.: 542,977

[22] Filed: Jun. 25, 1990

[51] Int. Cl.⁵ .............................................. B23C 3/00
[52] U.S. Cl. .............................. 409/175; 51/242 VS; 408/75; 408/83.5
[58] Field of Search ................... 409/175; 408/75, 80, 408/83.5; 51/241 VS; 33/632, 642

[56] References Cited

U.S. PATENT DOCUMENTS

| | | | |
|---|---|---|---|
| 842,952 | 2/1907 | Hall | 51/241 VS |
| 1,186,403 | 6/1916 | Johnsen | 408/83.5 |
| 1,980,975 | 11/1934 | Beck | 408/75 |
| 3,167,866 | 2/1965 | Steineman | 33/642 |
| 3,216,119 | 11/1965 | Street | 33/642 |
| 3,331,266 | 7/1967 | Brooks | 408/80 |
| 4,468,158 | 8/1984 | Pearce et al. | 51/241 VS |

*Primary Examiner*—Daniel W. Howell
*Attorney, Agent, or Firm*—Haugen and Nikolai

[57] ABSTRACT

The disclosure involves a portable milling machine for remachining radially directed access bores of interest in large check valves which is readily attached to and removed from the valve and is precisely alignable with respect to the center of the bore to be remachined. The machine is capable or remote operation.

11 Claims, 5 Drawing Sheets

VALVE SEAL RING SEATING MACHINE

BACKGROUND OF THE INVENTION

I. Field of the Invention

The present invention relates generally to a portable hole boring machine and, more particularly, to a machine which can be readily mounted on the access to a flow control valve of the class used in industrial pipelines carrying high pressure steam, or the like, for remachining or resurfacing the seal ring seat surface of the valve access when it becomes worn. This is accomplished without having to remove the valve from the pipeline.

II. Discussion of the Related Art

Large industrial pipelines used to transport fluids such as high pressure superheated steam will commonly include valves, including one-way or check valves, for fluid flow control. For example, electric utilities may include such pipelines for routing high pressure steam from a boiler to the turbines used in driving the electric generators. One valve commonly used is the Duo-Chek TM manufactured and sold by the Mission Manufacturing Company of Houston, TX. This valve is representative of a type commonly used in such installations. The need to refurbish these valves in more rapid and less expensive manner has created an important impetus for the present invention. Because such is the case, it is believed that a greater understanding of the problem will be helpful and it will next be described in greater detail.

With particular reference to FIGS. 1 and 2, such valves include a valve body 10 having a longitudinal bore 12 formed therethrough. A pair of hinge pins 14 extend transversely across the bore near the inlet end 16 and carry pivotally hinged first and second semi-circular, butterfly-type check valve plates 18 and 20. A spring 22 urges the valve plates to a normally closed, flow blocking or checking position which precludes flow back through the inlet. Of course, when the force on the inlet site exceeds the spring force plus the force exerted by any material downstream of the check valve, plates 18 and 20 are pivoted against the force of the spring 22 so that their planes approach a disposition parallel to the flow direction indicated by the arrow 24. The plates 18 and 20, then, are free to open and close to allow unidirectional flow in response to relative changes in up stream and down stream pressures.

After a period of use, the parts wear and it becomes necessary to service the valve plate assembly to assure continued proper operation. On should bear in mind that the valves and associated piping are normally quite large, i.e., 12 or more inches in diameter and are made of very heavy gauge material. The valve body is normally welded in place in the pipeline; and, therefore, it is difficult and time consuming to remove. The valve is provided with a radially disposed access port shown generally at 26 which addresses the inside of the valve body and allows access to the interior of the valve for repair of the valve plate assemblies in situ. The access port is a mechanical bore 28 of circular cross section of a predetermined precise diameter and normally sealed by a stainless steel plug 30, associated soft iron seal ring 32, a stainless steel spacer ring 34 and a stainless steel retainer ring 36 which fits in the manner of a snap ring into an annular groove 38 formed in the valve body. A circular cover 26 fits into the valve body 10 and bolts 42 pass through the cover into threaded bores in plug 30.

As the bolts are drawn tight, the plug 30 is pulled toward the cover to force the seal ring 32 and the spacer ring 34 tightly against the retainer ring 36 to form a high-pressure, gas-tight seal.

With the passage of time, and a workage of erosive or corrosive material such as such high-pressure, superheated steam, the seal ring 32 becomes worn. This further allows fluid under high pressure to erode the cylindrical wall of the bore 28 or seal ring surface of the access port. If unattended, high pressure steam escaping past the seal ring 32 easily scores, i.e., wears grooves in the access bore 28. This is a very common occurrence; however, simple replacement of the valve ring 32 does not adequately reseal the system. Thus, it becomes necessary to remachine or resurface the seating surface of the bore 28 to a new predetermined tight specification allowing a seal ring and spacer ring of a predetermined larger diameter to replace those previously used.

Accordingly, it is the primary object of the present invention to provide a portable boring tool which can be used to refinish the access bore 28 on a valve of the class described in situ.

With further regard to the in situ renovation of the valves, those skilled in the art will appreciate that in many industrial piping systems such as those found in power plants, only limited vertical or radial clearance may be available above the check valve access port; and, hence, there is added difficulty in gaining the necessary clearance to the access port for the use of a vertical milling machine. Moreover, the milling machine must be capable of rigid securement to the valve body with the cutting tool precisely centered and leveled relative to the access bore and valve body if truly concentrical remachining is to be achieved.

It is, thus, another principal object of the present invention to provide a reboring or milling machine which requires little in the way of vertical height and which can easily and rapidly positively position a machining tool with great precision with reference to three mutually perpendicular axes relative to the bore to be resurfaced.

It is further significant that in nuclear power facilities it can occur that a valve must be refurbished in a location where a radiation hazard may exist. As such, to limit human exposure, it is imperative that the setup and removal of the machine be accomplished quickly and that it be capable of operating without human intervention. Prior art equipment used to refurbish Duo-Chek TM valves commonly required total removal of the valve from the pipeline and reboring in a machine shop which required, in turn, prolonged exposure periods for cutting out and later rewelding of the valve into the line. By accomplishing reduction in exposure time for those working on the project, the invention represents much-needed safety step.

The valve seat resurfacing machine of the present invention requires only a fraction of an hour to assemble in position on the valve and to properly center the cutting head. When setup is complete, the machine can run by remote control without need for human intervention. Subsequent removal of the tool and replacement of the new rings and plug the access can also be accomplished in a manner of minutes.

SUMMARY OF THE INVENTION

By means of the present invention, definite breakthroughs in the art associated with refurbishing check valves of the class described is accomplished by the provision of a unique reboring or resurfacing machine which can be readily mounted onto and removed from the valve access bore. The present invention contemplates a specially designed milling machine configured to be mounted directly on the valve assembly and adapted to rematch the seal ring surface with that of the access bore in situ. The machine of the invention can further be adapted for stud removal, part reseating and other tasks without human intervention.

The machine is referenced to a substantially planar mounting base normally fabricated of heavy metal plate which carries the milling or boring machine in fixed alignable relation. The base plate is fixed by a special retaining ring snapped in a recess in the valve access bore having threaded holes to receive mounting bolts and which temporarily replaces the retaining ring normally used in the valve access assembly. An adjustable mounting support member is rigidly fixed to the mounting base with provision for precisely aligning the support member on the base. The machine of the invention further includes a bearing block or spindle carrier bolted or otherwise fixed to, a vertically adjustable member carried on the support member. A spindle or shaft is mounted through the bearing block and disposed substantially perpendicular to the mounting base. The spindle carries the boring tool mounted on a milling head fixed to the spindle. An hydraulic motor, or the like, is provided which is connected to rotate the spindle and provision is made to move the spindle mounting member along its longitudinal axis manually, or automatically using an electric servo motor or the like.

The bearing block or spindle carrier must be able to precisely center the spindle with respect to the sealing surface of interest to be remachined or resurfaced in order that "true round" be restored with respect to the bore of interest. In order to assure proper centering alignment of the boring tool, a duplicate alignment or calibration bearing block and integral spindle is provided which bolts to the fixed mounting vertically adjustable member in place of the operational system. The spindle of the alignment or calibration bearing block carries a Starrett dial indicator or other precise alignment tool. This tells how much the spindle is off-center with respect to the bore of interest. Adjustments in the alignment of the fixed mount support member with respect to the mounting base readily center the spindle with extreme precision.

In operation, the old assembly is first removed from the valve including the retaining ring. A retaining ring having threaded holes replaces the removed retaining ring and the mounting base is fixed to the retaining ring and thereby fixed over the access bore. The calibrating or alignment bearing block is utilized including the dial indicator to properly center the spindle with respect to the bore of interest. The alignment bearing block is then replaced by the operating or milling bearing block including the spindle and boring tool. The assembly is programmed to run remotely utilizing the electric servo mechanism to correctly position and move the milling tool vertically, i.e., in the direction perpendicular to the access opening along the surface to be rebored or resurfaced. The hydraulic motor operates in coordination with the electric servo motor to turn the spindle at the proper desired speed to accomplish the milling operation.

BRIEF DESCRIPTION OF THE DRAWINGS

In the drawings wherein like numerals are used to designate like parts throughout the same.

DESCRIPTION OF THE PREFERRED EMBODIMENT

Figure 1:
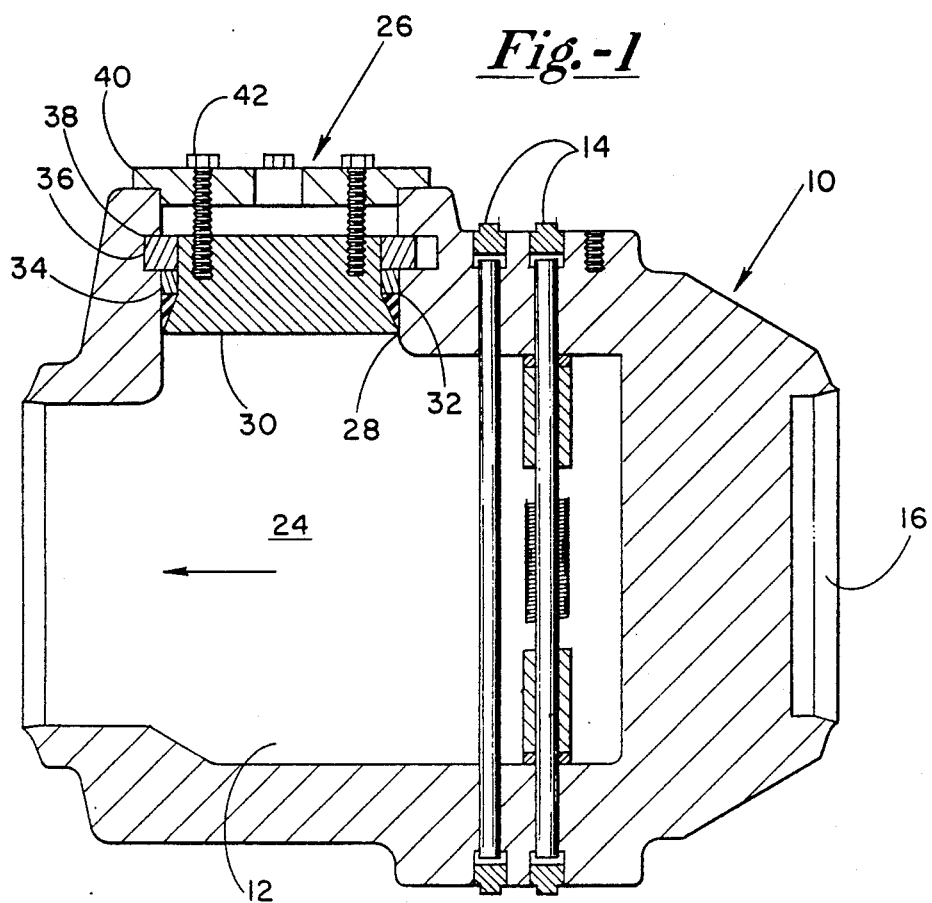
FIG. 1 depicts, in section, a valve of the class having an access with a bore for which the reboring or resurfacing system of the present invention was designed to repair.
Figure 2:
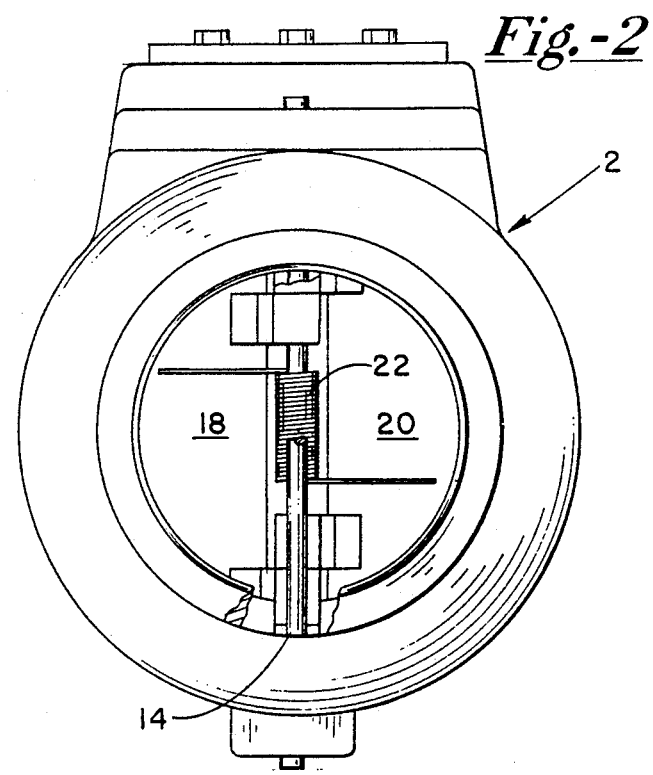
FIG. 2 is a right end view of the valve of FIG. 1.

FIGS. 1 and 2 have been previously described as background with respect to one illustrating critical need for the system of the present invention. In that regard, the valve of FIGS. 1 and 2 will be used as an illustration of a particular application of the portable machine tool of the invention-that of repairing the seal ring seating surfaces of a large steam check valve. With this in mind, a description of a portable milling or reboring machine tool in accordance with the invention will be undertaken next.

Figure 3A:
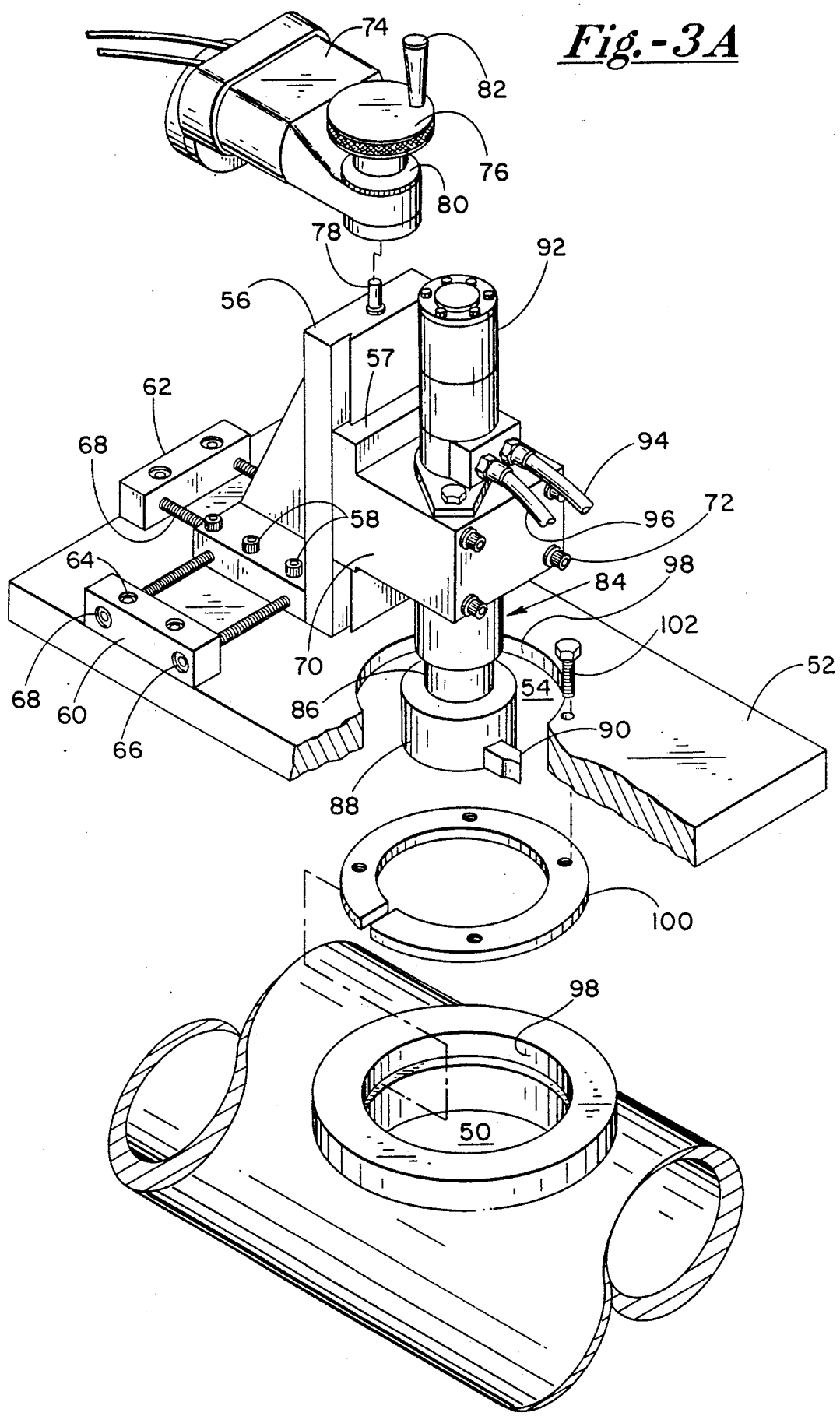
FIG. 3A is an exploded perspective view of the in situ boring or milling system of the invention.
Figure 3B:
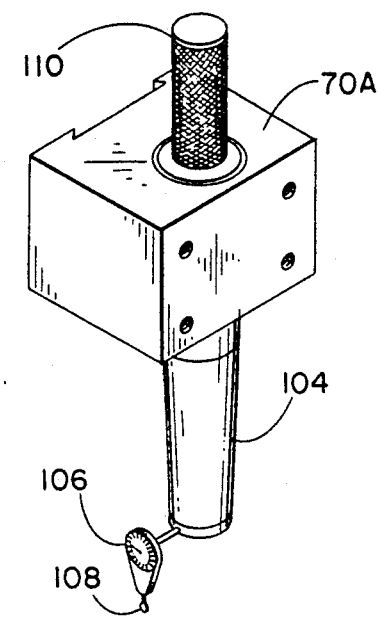
FIG. 3B depicts a calibration bearing block for use with the machine of FIG. 3A.
Figure 4:
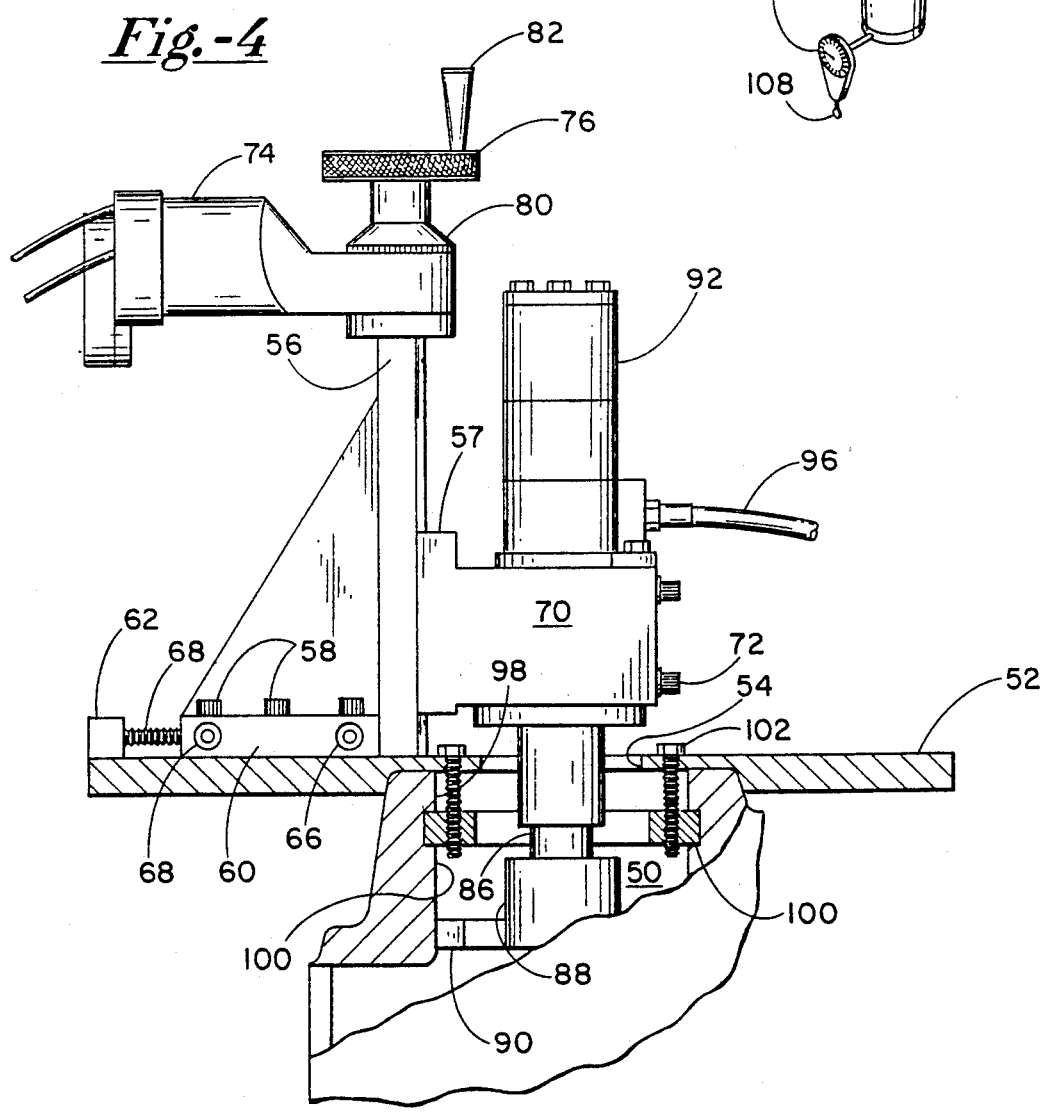
FIG. 4 is a side elevational view of the system of FIG. 3A.

FIGS. 3A is exploded perspective drawing of the portable milling tool or system of the invention showing the milling block in FIG. 3B depicts a calibration system. The system is shown in three-dimensional relation to a central bore of interest 50 which may be the seal ring seating surface previously described. The system includes a heavy metal, substantially planar mounting base plate 52 having an opening 54 designed to address the bore 50 to be resurfaced. An alignable fixed mounting member 56 is provided which is suitably fixed to the base member 52 as by bolts 58. Horizontally disposed alignment blocks 60 and 62 are provided suitably fixed to the mounting base 52 as by bolts 64, each said alignment block including a pair of alignment screws as at 66 which cooperate to properly align the mounting member 56 on the base plate 52 as will be discussed in greater detail later. The fixed mounting member 56 is designed to fix the position of and carry a bearing block or spindle carrier 70 which is mounted on a further vertically adjustable block 57 in tongue and groove relation to the fixed mounting member 56 and secured as by a plurality of bolts 72. The bearing block or spindle carrier assembly is caused to move in a vertical direction by an electric servo motor system 74 including manual or machine operable rotating knob 76 which is designed to rotate shaft 78 to move member 57 and hence the bearing block or spindle carrier mount along the vertical surface of the member 56 as desired. A caliper to measure the knob position in relation to vertical travel is also depicted at 80 along with a handle 82 for manual operation of the turning knob which function in a well-known manner, the system being capable of either manual or fully automatic operation.

A milling or boring spindle is journaled within the bearing block or spindle carrier 70 and depicted generally by 84. The spindle includes a quill housing 86 on which a hollow fitting 88 is mounted containing one or more precision tool steel cutters depicted by 90. An hydraulic motor 92 served by hydraulic lines 94 and 96 is utilized to rotate the spindle 86 in a well-known manner.

The mounting plate 52 is provided with an circular indented section 98 or reduced cross section about the periphery of the opening 54 adapted to address the outer rim of the bore of interest. An alternate retaining ring 100 is depicted which, with bolts 102, attaches the mounting plate 52 securely about the bore 50. The retaining ring 100 is adapted to replace the retaining ring 36 (FIG. 1) to provide a means for easily and accurately fixing the portable milling machine tool of the invention with respect to the opening to be rebored or resurfaced 50. Calibration for accurate resurfacing will next be described.

In order to assure proper centering alignment of the machine tool of the invention, duplicate alignment or calibration bearing block 70A (FIG. 3B) having an integral spindle 104 mounted therein, is provided which bolts to the fixed mount 56, 57 in place of the operational bearing block o spindle 70 for precise centering alignment and/or calibration of the system prior to the boring or milling operation. That spindle carries a precision centering device, which may be a Starrett dial indicator as illustrated at 106, having a gage 108 which can be used to precisely center the spindle 104 with respect to the opening 50 prior to the mounting of the actual boring or milling bearing block 70 carrying the milling spindle 84. The spindle 104 is designed to be turned by hand using the knurled handle 110. The centering operation involves adjustment screws 66 and 68 as necessary and tightening screws 58.

In the valve refurbishing operation, first the bolts 42 are removed and the cover 40, sealing ring 32, spacer 34 and retaining ring 36 together with the plug 30 are removed from the access opening to the valve 10. With this system open of course, any concurrently necessary repairs to the check valve system itself can be made. Next, the replacement retaining ring 100 is inserted in the bore and the portable machine tool of the invention fixed about the access bore by fastening the base plate 52 to the ring 100 utilizing the plurality of bolts 102. With the alternate or calibration bearing block or spindle carrier 70A mounted on the members 56 or 57, the spindle 104 is precisely centered in the opening 50 utilizing the Starrett dial indicator in conjunction with the alignment screws 66 and 68 to precisely fix the position of the member 56 and, in turn, the spindle 104 in the center relative to the opening 50. The calibration bearing block 70A is removed and replaced by the milling bearing block 70 with the proper spindle and cutting tool in place.

This having been accomplished, the actual boring, milling or resurfacing can take place by preprogrammed remote control of the servo electric motor and the hydraulic motor to operate the system without human intervention. The entire system can thereafter readily be removed by loosening bolts 102 and removing the portable milling machine from the opening 50. The access is then closed utilizing the plug member spacer and retaining ring together with a slightly larger size sealing ring into place of the one removed to provide a newly generated perfectly matched set of sealing surfaces to the access opening of the valve.

Figure 5:
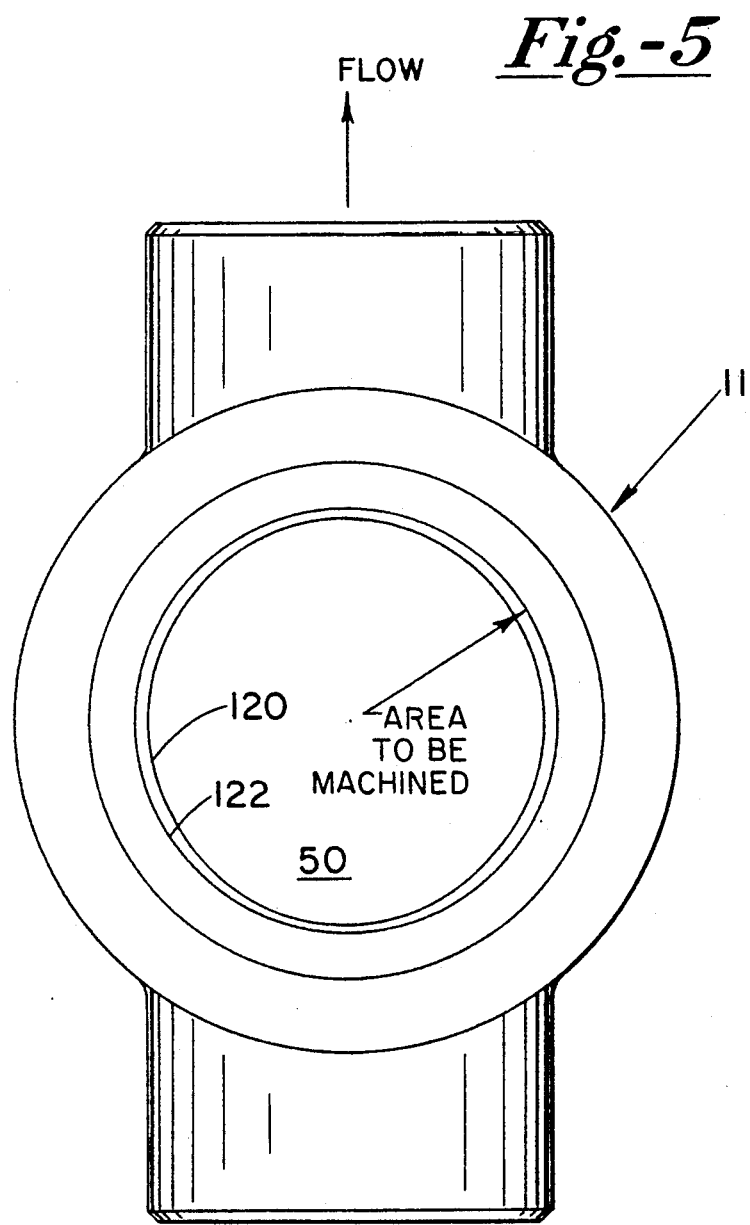
FIG. 5 is a top view of the access opening in the valve prior to reboring or resurfacing in accordance with the invention.

FIG. 5 shows an illustration of a scored valve access bore as seen along the bore axis. The out-of-round area is represented by the line 120 and true round by the line 122.

Figure 6:
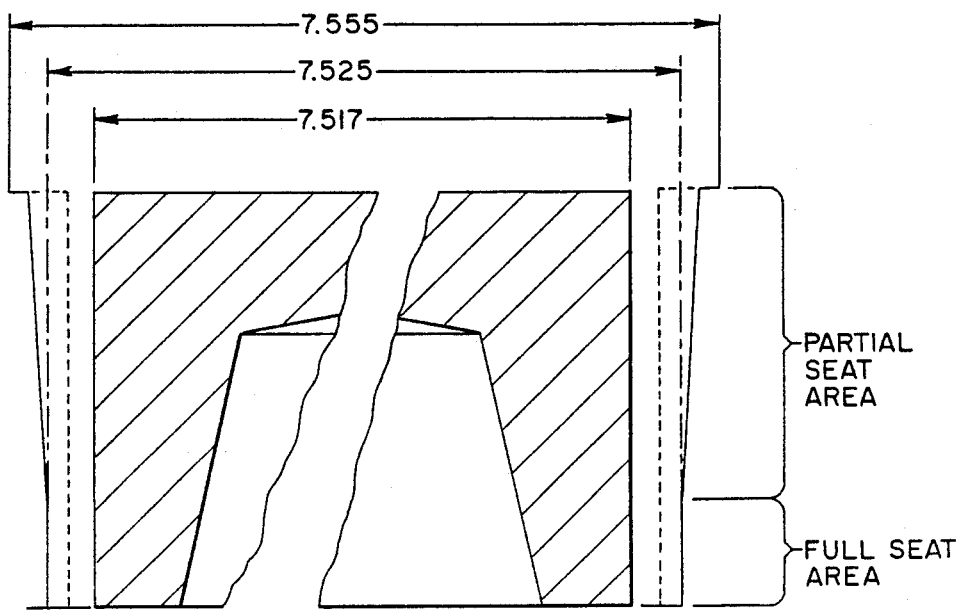
FIGS. 6 and 7 depict greatly enlarged cross sectional views of bores illustrates typical tolerances of seats and rings associated with reboring or resurfacing.
Figure 7:
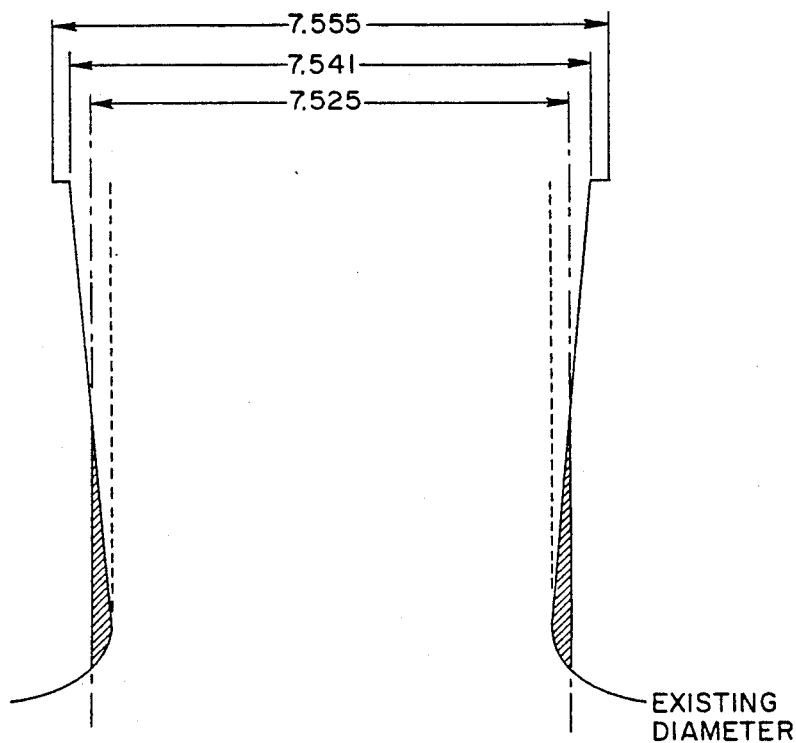

FIG. 6 and 7 depict a plurality of possible reboring diameters which can be used with replacement seal rings illustrating that the seal ring seating surfaces of the valve can be rebored several times and the stainless steel plug refitted with a seal ring and the system resealed before the valve itself has to be replaced.

This invention has been described herein in considerable detail in order to comply with the statutes and to provide those skilled in the art with information needed to apply the novel principles and to construct and to use such specialized components as are required. However, it is to be understood that the invention can be carried out by specifically different equipment and devices and the various modifications both to equipment details and operating procedures can be accomplished without departing from the scope of the invention itself.

What is claimed is:

1. A portable milling apparatus for remachining the inner surface of a fixed hollow bore of interest in situ comprising:
   base support member integral to and carrying the milling apparatus, said base support member having an opening therein for addressing the hollow bore of interest;
   mounting means associated with said base support member for fixing said base support member in relation to said bore of interest;
   bearing block support means mounted on and in adjustable fixed relation to said base support member, said bearing block support means further having a bearing block support member adjustable in the direction normal to the plane of said base support member;
   bearing block fixed to said bearing block support member;
   spindle means for carrying a milling tool journaled for rotation about its longitudinal axis in said bearing block;
   adjustment mean for adjusting the position of said bearing block support means on said base support member to center said spindle with respect to said bore of interest;
   means for rotating said spindle journaled in said bearing block; and
   means for adjusting said bearing block support member in a plane normal to said base support member to move said spindle along its longitudinal axis and thereby move said milling tool along said bore; and
   calibration means for centering the longitudinal axis of said spindle means with respect to said bore of interest.

2. A portable milling apparatus for remachining the inner surface of the fixed hollow bore of interest in a valve access port in situ comprising:
   base support member integral to and carrying the milling apparatus, said base support member having an opening therein for addressing the hollow bore of interest;
   mounting means in said valve access port which cooperates with said base support member to fix said base support member to said valve in relation to said valve access port such that said opening in said base support member coincides with said bore of interest wherein said access port is characterized by an outer lip and said base support member further has a lower surface configured to address the lip of said access port;

bearing block support means mounted on and alignably adjustable fixed relation on said base support member, said bearing block support means including bearing block support member movably adjustable in the direction normal to the plane of said base support member;

bearing block fixed to said bearing block support member;

spindle means for carrying a milling tool journaled for rotation about its longitudinal axis in said bearing block means;

adjustment means for adjusting the alignment relation of said bearing block support member to said base support member to center said spindle with respect to said bore of interest;

means for rotating said spindle;

means for vertically adjusting s id bearing block support member to move said spindle means along its longitudinal axis and thereby move said milling tool along said bore; and calibration means for centering the longitudinal axis of said spindle means with respect to said bore of interest.

3. The portable milling apparatus of claim 1 wherein said mounting means further comprises: retainer ring means disposed in an annular groove in the outer portion of the bore of interest and having a plurality of threaded recesses therein, a plurality of mounting bolt means extending through coaxially disposed holes in the base support member and received in said threaded recesses which, when tightened, fix the base support member with respect to said bore of interest, the opening therein substantially surrounding the bore of interest.

4. The portable milling apparatus of claim 3 wherein said bore of interest has a lip extending outward beyond from the situs of the bore and wherein said bore support member is further provided with a recess which matches the lip when the base support member is fixed to said retainer ring.

5. The portable milling apparatus of claim 1 further comprising, calibration means for centering the longitudinal axis of said spindle means with respect to said bore of interest, said calibration means further comprising:

calibration bearing block adapted to replace said bearing block for calibration;

calibration spindle means carried in said calibration bearing block means;

precise alignment tool carried by said calibration spindle for determining the precise center of said bore in conjunction with the rotation.

6. The portable milling apparatus of claim 2 wherein said mounting means further comprises: retainer ring means disposed in an annular groove in the outer portion of the bore of interest and having a plurality of threaded recesses therein, a plurality of mounting bolt means extending through coaxially disposed holes in the base support member and received in said threaded recesses which, when tightened, fix the base support member to said valve body against the lip of said access port.

7. The portable milling apparatus of claim 2 wherein said calibration means further comprises:

calibration bearing block adapted to replace said bearing block for calibration;

calibration spindle means carried in said calibration bearing block means;

precise alignment tool carried by said calibration spindle for determining the precise center of said bore.

8. The portable milling apparatus of claim 1 wherein said means for rotating the spindle journaled in the bearing block is an hydraulic motor.

9. The apparatus of claim 2 wherein the means for rotating the spindle journaled in the bearing block is an hydraulic motor.

10. The portable milling apparatus of claim 1 wherein the means for vertically adjusting the bearing block support member is an electric servo motor.

11. The portable milling apparatus of claim 2 wherein the means for vertically adjusting the bearing block support member is an electric servo motor.

* * * * *